United States Patent [19]
Fujimoto et al.

[11] Patent Number: 5,638,184
[45] Date of Patent: Jun. 10, 1997

[54] ELECTRONIC VIDEO CAMERA WITH RECORDING AND REPRODUCING FUNCTIONS

[75] Inventors: Ryo Fujimoto, Tokyo; Masaki Okada, Kanagawa-ken; Satoshi Tonosaki, Tokyo, all of Japan

[73] Assignee: Canon Kabushiki Kaisha, Tokyo, Japan

[21] Appl. No.: 385,076

[22] Filed: Feb. 7, 1995

Related U.S. Application Data

[63] Continuation of Ser. No. 102,005, Aug. 4, 1993, abandoned.

[30] Foreign Application Priority Data

| Aug. 25, 1992 | [JP] | Japan | 4-248672 |
| Aug. 31, 1992 | [JP] | Japan | 4-231974 |
| Sep. 11, 1992 | [JP] | Japan | 4-243521 |

[51] Int. Cl.⁶ .................................................. H04N 5/76
[52] U.S. Cl. ........................ 386/112; 358/310; 348/392; 348/424; 386/33; 386/117
[58] Field of Search ............................. 358/335, 906, 358/310; 348/909.1, 390, 399, 424, 392; 360/33.1; H04N 5/225, 5/76, 9/79

[56] References Cited

U.S. PATENT DOCUMENTS

| 4,837,632 | 6/1989 | Kubo et al. | 348/208 |
| 4,956,726 | 9/1990 | Takimoto et al. | 358/310 |
| 5,032,927 | 7/1991 | Watanabe et al. | 358/335 |
| 5,065,232 | 11/1991 | Kondo | 358/906 |
| 5,117,246 | 5/1992 | Takahashi et al. | 348/208 |
| 5,130,742 | 7/1992 | Miyamoto et al. | 358/909 |
| 5,142,375 | 8/1992 | Fukuda et al. | 358/906 |
| 5,168,364 | 12/1992 | Kondo et al. | 358/906 |

*Primary Examiner*—Thai Q. Tran
*Assistant Examiner*—Khoi Truong
*Attorney, Agent, or Firm*—Robin, Blecker, Daley & Driscoll

[57] ABSTRACT

An electronic video camera which picks up an object image and records on a recording medium an image signal corresponding to the object image picked up is arranged to record an information signal indicative of an image pickup sensitivity along with the image signal when the latter is recorded, to reproduce the image signal and the information signal recorded on the recording medium and to control the characteristic of a signal processing action on the reproduced image signal according to the reproduced information signal. The arrangement enables the electronic video camera to effectively prevents image quality deterioration, so that the image signal can be reproduced with a high image quality.

6 Claims, 9 Drawing Sheets

ELECTRONIC VIDEO CAMERA WITH RECORDING AND REPRODUCING FUNCTIONS

This is a continuation application under 37 CFR 1.62 of prior application Ser. No. 08/102,005 filed on Aug. 4, 1993 (aban.).

BACKGROUND OF THE INVENTION

1. Field of the Invention

This invention relates to an electronic video camera.

2. Description of the Related Art

Electronic video camera systems include systems called still video camera systems, which are arranged to convert an image of an object of shooting (hereinafter referred to as an object image) into an electrical signal at an image pickup part, to record the electrical signal on a suitable recording medium such as a two-inch floppy disk, a hard disk, an IC memory card or the like and to reproduce the object image recorded.

Generally, electronic video camera systems of the above-stated kind are arranged to have recourse to a flash device in taking a shot of an object under a dark condition. However, the reachable distance of the light of the flash device is limited. To compensate for the insufficiency of light, the image pickup part has recently come to be provided with a circuit for increasing the image pickup sensitivity of the image pickup part. The image pickup (shooting) sensitivity can be increased by operating a sensitivity increasing switch.

The sensitivity increasing circuit is arranged to increase the gain of an electric circuit system, so that the output level of an image sensor can be greatly amplified before it is outputted even in cases where the output level of the image sensor is low.

Some of the electronic video camera systems is provided with a high image quality switch for selecting a high image quality mode. In this case, a shooting action is performed by suppressing the gain of an electric system. With the electronic video camera system set in the high image quality mode, the S/N ratio of an image signal can be prevented from deteriorating if the quantity of light incident on the image sensor is sufficient.

Further, the electronic video camera systems are arranged in general to make white balance adjustment in recording and reproducing color image signals. The white balance adjustment is carried out by adjusting the gains of the R, G and B (three primary colors of light) components of an image signal outputted, for example, from the image pickup part according to the color adaptation of the human eye.

With the conventional electronic video camera system provided with the sensitivity increasing switch for increasing the image pickup sensitivity as mentioned above, however, a noise component generated by the image sensor is amplified along with the image signal. Then, the S/N ratio of the image signal is deteriorated as a whole by the noise component to degrade the image quality.

Another problem with the conventional electronic video camera systems lies in that, when the high image quality mode is selected by operating the high image quality mode switch, efficiency in utilizing the light of the object image becomes lower. The lower efficiency then lowers the image pickup sensitivity.

It is a further problem with the conventional electronic video camera system that, the gain of the blue color (B) component must be greatly increased if the color temperature of the object image is very low, or the gain of the red color (R) component must be greatly increased if the color temperature is high. In either case, the S/N ratio of the image signal is deteriorated by the increased gain to eventually degrade the image quality.

During recent years, some of electronic video cameras have come to be arranged to convert the object image into an electrical signal by a photoelectric conversion element and then to convert the electrical signal further into a digital signal before recording. The cameras of this kind digitally store image signals by using a memory element such as an IC memory card or a hard disk or the like as a recording medium.

Like in the case of silver-halide type cameras, the operability of electronic video cameras of the above-stated kind can be greatly improved by arranging them to have a full automatic shooting mode in which a shutter speed, an exposure, the use or nonuse of a flash device, etc., are automatically decided to lessen the burden of the camera operator at the time of shooting.

However, unlike the full automatic shooting mode of the silver-halide type camera, the electronic video camera involves its own parameters such as a compression ratio for the image signal, etc., even while the shutter speed, an exposure and the use or nonuse of a flash device are automatically decided. Therefore, even if the control method of the silver-halide type camera for the full automatic mode is applied to the electronic video camera, it has been hardly possible to sufficiently improve the operability of the electronic video camera by enabling it to be completely in the full automatic shooting mode.

The performance of the image sensor which serves to convert the object image into an electrical signal is being improved. Generally, however, the sensitivity of the image sensor still remains low. It is thus hardly possible to obtain a sufficiently sharp image signal by taking a shot under a low illuminance condition without any auxiliary illumination. To solve this problem, some of the known electronic video cameras is arranged to be capable of altering the sensitivity of an image pickup part (consisting of an image sensor and an amplifier for amplifying the output of the image sensor) and to take a shot under a low illuminance condition by increasing the sensitivity of the image pickup part.

However, as mentioned above, the image quality of the image signal degrades in general when the image pickup sensitivity is increased. The image signal having such a degraded image quality has been recorded in the same manner as a normal image signal which has a good image quality and is obtained by shooting without increasing the image pickup sensitivity. In other words, the conventional electronic video camera has been arranged to allow each recording signal recorded on a recording medium to have a predetermined amount of information irrespective of the image quality. Such arrangement has resulted in a poor image signal recording efficiency.

SUMMARY OF THE INVENTION

It is a general object of this invention to provide an electronic video camera which is capable of solving the problems mentioned in the foregoing.

It is a more specific object of this invention to provide an electronic video camera which is capable of giving a high quality image signal by preventing the image quality of the image signal from degrading.

Under this object, an electronic video camera arranged as one embodiment of this invention to pick up an object image, to record on a recording medium an image signal formed by converting the object image picked up into an electrical signal and to reproduce the image signal recorded on the recording medium comprises image pickup means arranged to pick up an object image and to output an image signal corresponding to the object image picked up, sensitivity setting means for setting an image pickup sensitivity of the image pickup means, recording means for recording on the recording medium both the image signal outputted from the image pickup means and an information signal indicative of the image pickup sensitivity set by the sensitivity setting means, and control means arranged to reproduce the image signal and the information signal recorded on the recording medium by the recording means and to control a characteristic of a signal processing action to be performed on the reproduced image signal according to the reproduced information signal.

It is another object of this invention to provide an electronic video camera which is arranged to have a good operability.

Under that object, an electronic video camera arranged as one embodiment of this invention to pick up an object image and to record on a recording medium an image signal formed by converting the object image picked up into an electrical signal comprises image pickup means arranged to pick up an object image and to output an image signal corresponding to the object image picked up, detecting means for detecting an picked-up state of the object image obtained at the image pickup means, information amount varying means arranged to vary an amount of information of the image signal outputted from the image pickup means and to output the image signal after the amount of information thereof is varied, recording means for recording the image signal outputted from the information amount varying means on the recording medium, and control means arranged to set, in accordance with a result of detection provided by the detecting means, the amount of information of the image signal to be outputted from the information amount varying means.

It is a further object of this invention to provide an electronic video camera which is arranged to be capable of efficiently recording an image signal on a recording medium.

Under the above-stated object, an electronic video camera arranged as one embodiment of this invention to pick up an object image and to record on a recording medium an image signal formed by converting the object image picked up into an electrical signal comprises image pickup means arranged to pick up an object image and to output an image signal corresponding to the object image picked up, sensitivity setting means for setting an image pickup sensitivity of the image pickup means, information amount varying means arranged to vary an amount of information of the image signal outputted from the image pickup means and to output the image signal after the amount of information thereof is varied, recording means for recording the image signal outputted from the information amount varying means on the recording medium, and control means arranged to set, in accordance with the image pickup sensitivity set by the sensitivity setting means, the amount of information of the image signal outputted from the information amount varying means.

These and further objects and features of this invention will become apparent from the following detailed description of embodiments thereof taken in conjunction with the accompanying drawings.

DETAILED DESCRIPTION OF THE PREFERRED EMBODIMENTS

The following describes embodiments of this invention.

Figure 1:
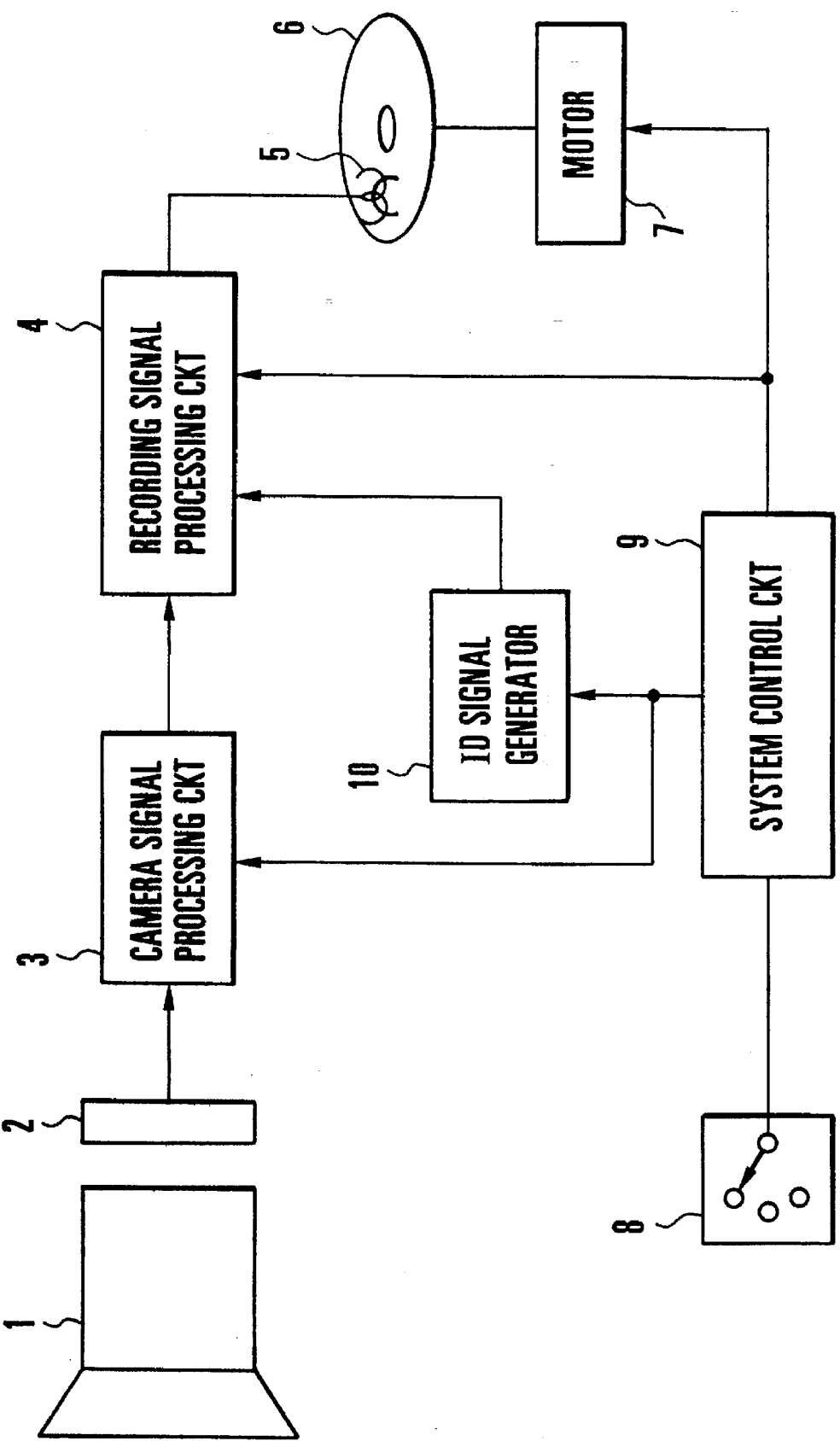
FIG. 1 is a block diagram showing the arrangement of an image pickup and recording device of an electronic video camera system arranged according to this invention as a first embodiment thereof.

FIG. 1 is a block diagram showing the arrangement of an image pickup and recording device of an electronic video camera system arranged as a first embodiment of this invention. In FIG. 1, reference numeral 1 denotes a phototaking lens. An object image formed on the image forming plane of an image sensor 2 through the photo-taking lens 1 is converted into an electrical signal as an image signal by the image sensor 2. The image signal is processed through a camera signal processing circuit 3 by a recording signal processing circuit 4. The signal processed is recorded by a magnetic recording head 5 on a recording medium 6 which is, for example, a 2-inch video floppy disk. The recording medium 6 is driven to rotate by a motor 7.

In a case where a shooting object is dark at the time of shooting, a sensitivity change-over switch 8 is operated. In response to this operation, a system control circuit 9 switches the gain of the camera signal processing circuit 3 from one rate of gain over to another in such a way as to increase a rate at which the image signal outputted from the camera signal processing circuit 3 is amplified. Then, an information signal indicating that the image pickup sensitivity has been increased is sent from the system control circuit 9 to an ID signal generator 10. A coded information signal indicating that the image pickup sensitivity has been increased is then sent from the ID signal generator 10 to the recording signal processing circuit 4 so as to be multiplexed with the image signal and recorded on the recording medium 6 along with the image signal.

Figure 2:
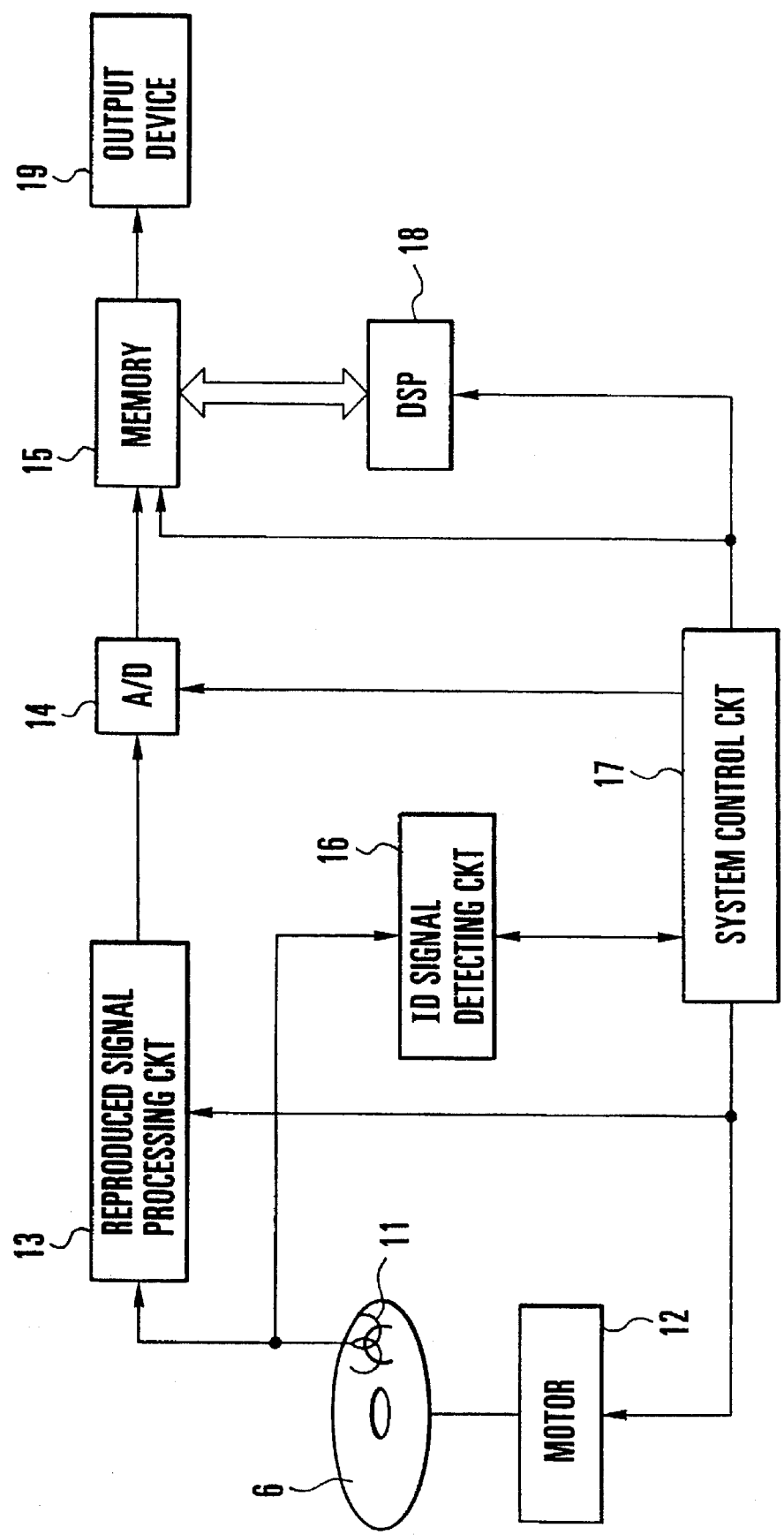
FIG. 2 is a block diagram showing the arrangement of a reproducing device of the electronic video camera system arranged as the first embodiment of this invention.

FIG. 2 is a block diagram showing a reproducing device included in the electronic video camera system which is the first embodiment of this invention. Referring to FIG. 2, image information (signal) recorded on the recording medium 6 is reproduced by a magnetic reproducing head 11. The recording medium 6 is driven to rotate by a motor 12. The image signal reproduced by the magnetic reproducing head 11 is processed by a reproduced signal processing circuit 13 and is then A/D (analog-to-digital) converted into digital image data by an A/D converter 14. After the A/D conversion, the digital image data is stored in a memory 15.

An ID signal included in the output of the magnetic reproducing head 11 is detected by an ID signal detecting circuit 16. An information code which indicates the image pickup sensitivity set at the time of shooting and included in the ID signal reproduced is sent through a system control circuit 17 to a DSP (digital signal processor) 18. The DSP 18 is arranged to process the data stored in the memory 15 by exchanging data with the memory 15 and by performing an arithmetic operation. The data stored in the memory 15 is then sent to an output device 19.

At the DSP 18, at least one of the amount of noise reduction and the amount of correction of frequency characteristic is controlled in accordance with an increased setting value of the image pickup sensitivity set at the time of shooting. More specifically, in a case where the ID signal indicates an increase in the image pickup sensitivity, the image signal has been recorded in a state of having the gain of the circuit increased and, as a result, a larger amount of noise is included in the reproduced image signal as the noise of the image sensor 2 has been amplified at the time of recording. In this case, the DSP 18 performs its process in such a way as to increase the amount of noise reduction without increasing the amount of frequency characteristic correction.

In a case where the ID signal indicates that the image pickup sensitivity is not increased at the time of shooting or where the ID signal indicates that the image pickup sensitivity is lowered for "high image quality recording", either the amount of noise reduction is decreased or no noise reduction is made by the DSP 18, and the amount of frequency characteristic correction is increased by the DSP 18.

Generally, the high frequency component of a microsignal showing the details of an image diminishes when a noise reduction process is carried out. Therefore, the amount of noise reduction is preferably small in cases where the amount of a noise component is small.

Figure 3:
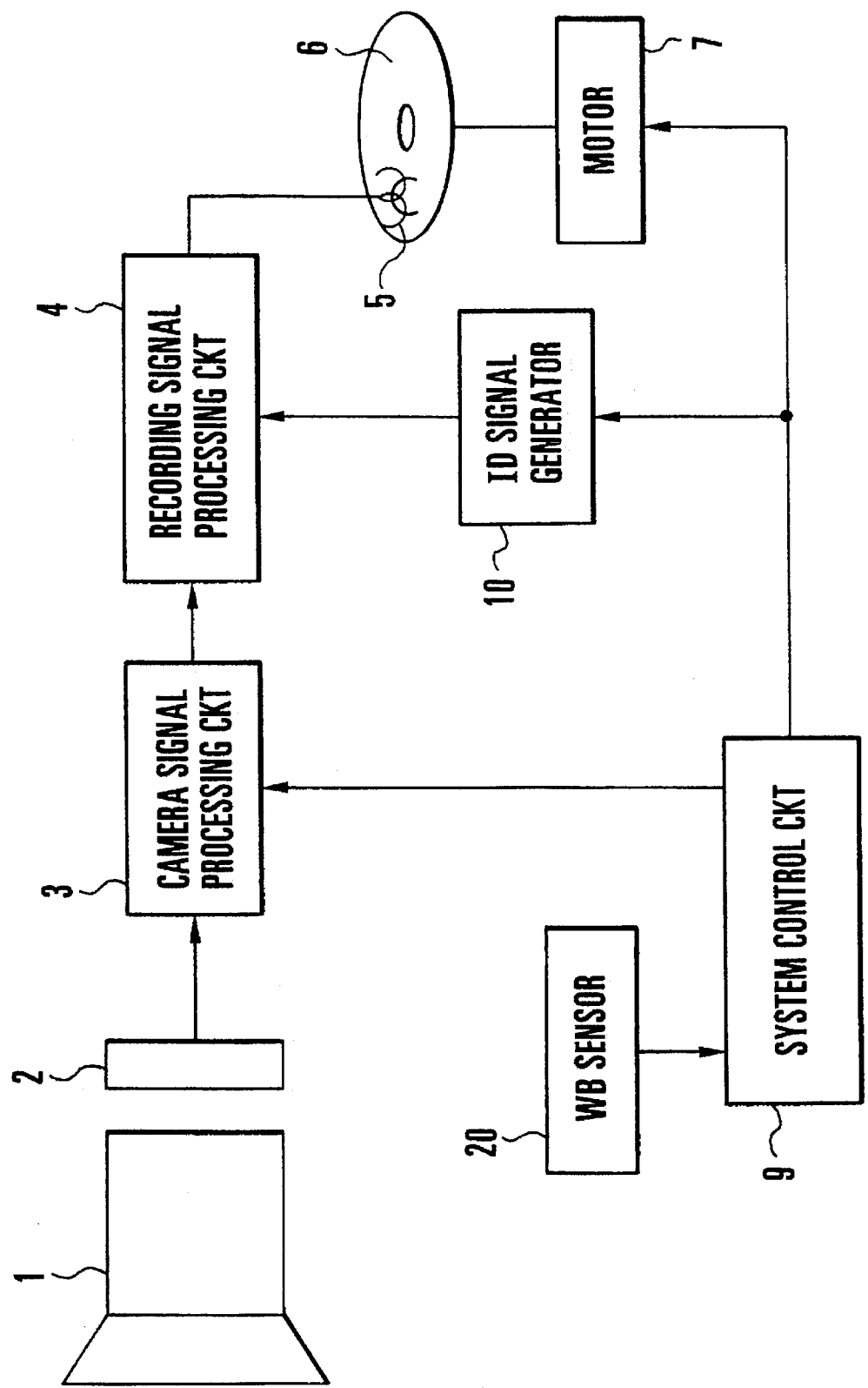
FIG. 3 is a block diagram showing the arrangement of an image pickup and recording device of an electronic video camera system arranged according to this invention as a second embodiment thereof.

Next, a second embodiment of this invention is described with reference to FIG. 3. In FIG. 3, all the parts which are the same as those of the first embodiment are indicated by the same reference numerals.

The second embodiment differs from the first embodiment in the arrangement of the image pickup and recording device. In this case, the sensitivity change-over switch 8 shown in FIG. 1 is replaced with a white balance (abbreviated to WB) sensor 20. With the exception of this, the rest of arrangement of FIG. 3 and that of the reproducing device are the same as the first embodiment.

The following description is limited to the points of difference of FIG. 3 from FIG. 1. Color temperature data detected at the white balance sensor 20 is inputted to the system control circuit 9. The system control circuit 9 then causes the camera signal processing circuit 3 to make color balance adjustment on the basis of the color temperature data. Information on the amount of white balance adjustment is coded by the ID signal generator 10. The coded information is then multiplexed with the image signal at the recording signal processing circuit 4. A signal thus obtained with the white balance information multiplexed with the image signal is recorded on the recording medium 6 by the magnetic recording head 5.

The operation of the reproducing device of the electronic camera system which is the second embodiment of this invention is described, covering only its points of difference from the first embodiment, by utilizing FIG. 2, as follows:

The ID signal detected at the ID signal detecting circuit 16 is supplied to the system control circuit 17. The white balance information included in the ID signal is sent from the system control circuit 17 to the DSP 18. If the white balance information indicates a state of a low color temperature, the image signal has been recorded in a state of having the gain of the B (blue) color component thereof increased by a considerably large amount. As a result, the reproduced image signal has a large amount of a noise component for the B (blue color) component. In this instance, therefore, the DSP 18 is set in such a way as to increase the amount of noise reduction for the B (blue color) component.

On the contrary, if the white balance information included in the ID signal detected at the ID signal detecting circuit 16 indicates a state of having a high color temperature, the image signal has been recorded in a state of having the gain of the R (red color) component thereof increased by a considerably large amount. As a result, the reproduced image signal has a large amount of a noise component for the R component. In that instance, the DSP 18 is set to increase the amount of noise reduction for the R component.

The DSP 18 is capable of carrying out frequency characteristic correction, color correction and other correcting and improving actions of varied kinds. With the amount of noise reduction arranged to be controlled on the basis of the white balance information, the image quality of the image signal can be enhanced.

Each of the embodiments described is arranged to use a 2-inch video floppy disk as a recording medium. In accordance with this invention, however, the recording medium is not limited to that kind but may be any of recording media of other kinds such as a magnetic card, a hard disk device and so on.

The reduction of noises, the correction of frequency characteristic, etc., are adaptively carried out according to the state of the image in general. For example, the amount of noise reduction is increased for a flat part or a dark part of the image. In this instance, the amount of noise reduction and the amount of frequency characteristic correction may be collectively controlled on the basis of information obtained by adding information on the image pickup (shooting) sensitivity to the information on the state of the image.

In the case of the second embodiment, the amount of noise reduction is controlled on the basis of the white balance information. However, the embodiment may be arranged to control the amount of something else, such as correction of color reproducibility. In other words, in cases where the color temperature is very high (or low), the color of the image tends to become more bluish (or reddish) than the real color. In such a case, the embodiment may be arranged to control the amount of correction of such a state.

As described in the foregoing, the electronic video camera system which is a first embodiment of this invention is arranged to record, along with the image signal, the information on a setting value of the image pickup sensitivity set at the time of shooting. In processing the reproduced image signal at the time of reproduction, the amount of noise reduction and the amount of correction of frequency characteristic are controlled with the information on the setting value of the image pickup sensitivity taken into consideration. This control arrangement gives an image signal having an overall high image quality at the time of reproduction.

The electronic video camera system which is the second embodiment of this invention is arranged to record, along with the image signal, information on white balance obtained at the time of shooting. In processing the image signal at the time of reproduction, the amount of noise reduction and the amount of correction of color reproducibility are controlled on the basis of the white balance information recorded. The second embodiment is thus arranged to be capable of correctly reproducing the colors of the object image by reducing the amount of the noise component of the reproduced image signal at the time of reproduction.

Figure 4:
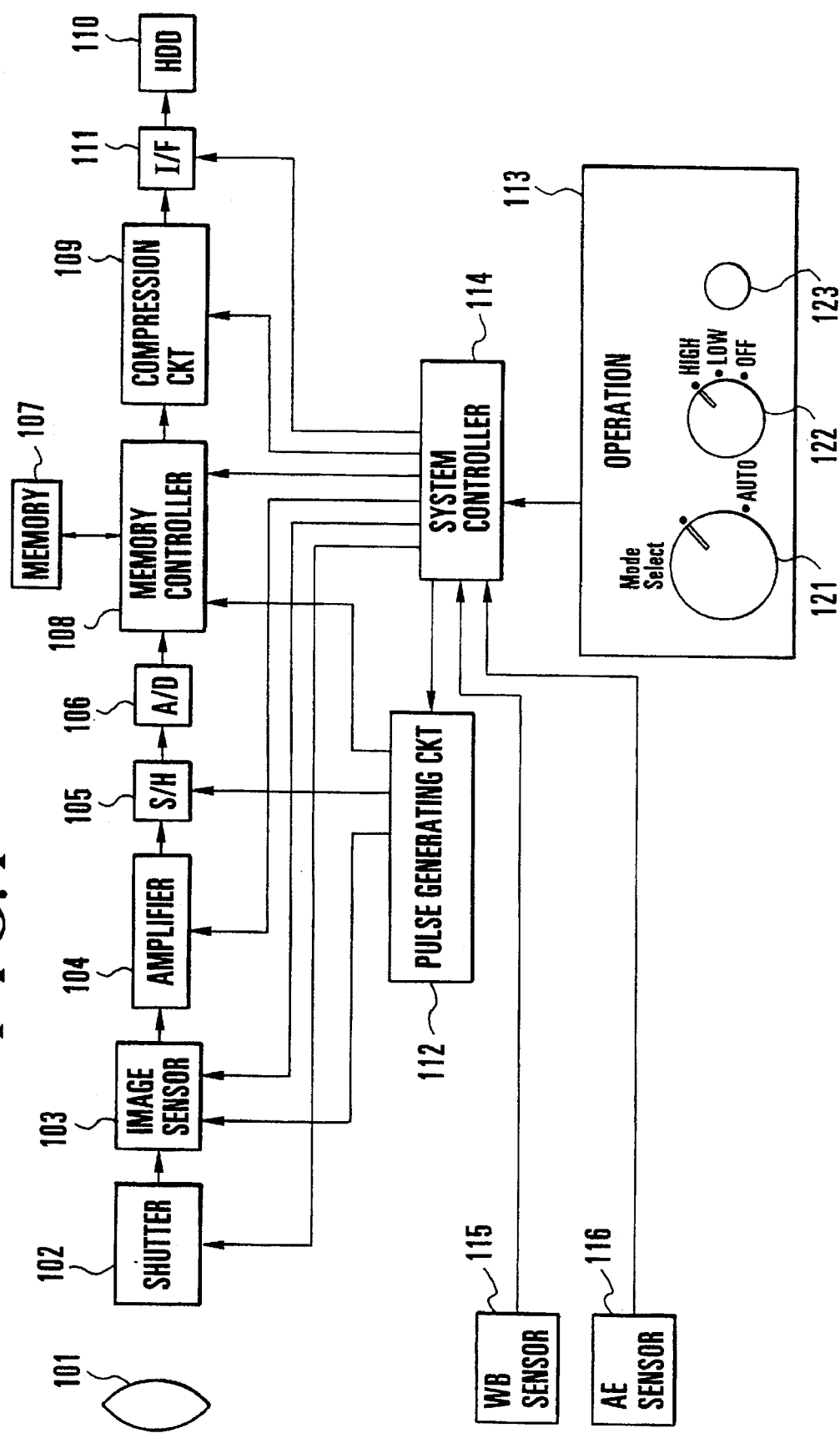
FIG. 4 is a block diagram showing an electronic video camera arranged according to this invention as a third embodiment thereof.

FIG. 4 is a block diagram showing an electronic video camera which is arranged according to this invention as a third embodiment thereof.

Referring to FIG. 4, a photo-taking lens 101 is arranged to form an object image on an image sensor 103. A shutter 102 is arranged to expose the image sensor 103 to the light of the object image coming through the phototaking lens 101 for a predetermined period of time. The image sensor 103 is arranged to convert the object image into an electrical signal which is an image signal. An amplifier 104 is arranged to amplify the image signal outputted from the image sensor 103. A sample-and-hold (hereinafter referred to as S/H) circuit 105 is arranged to hold the amplified image signal from the amplifier 104 for a predetermined period of time. An A/D conversion circuit 106 is arranged to convert the image signal from the S/H circuit 105 into a digital signal, which will be hereinafter referred to as the image data.

A memory 107 is arranged to store the image data obtained from the A/D conversion circuit 106. A memory controller 108 is arranged to control the input and output of the image data to and from the memory 107. A compression circuit 109 is provided for reducing the amount of information of the image data stored in the memory 107. A hard disk device (hereinafter referred to as HDD) 110 is provided for recording the image data which is temporarily stored in the memory 107. The HDD 110 is unitized to be detachably attachable to the body of the electronic video camera. The third embodiment of this invention is arranged to use the HDD 110 as a recording medium for recording the image data. However, in accordance with this invention, the recording medium is not limited to the HDD but may be an optical recording medium, a photoelectro-magnetic recording medium or a semiconductor storage medium.

An interface circuit (hereinafter referred to as I/F circuit) 111 is arranged to control the input and output of the image data to and from the HDD 110. A pulse generating circuit 112 is arranged to generate pulses for driving the image sensor 103, the S/H circuit 105 and the memory controller 108. An operation part 113 is provided for selection of a mode of the electronic video camera and for operating the electronic video camera. The operation part 113 includes a shooting mode selection switch 121, a compression mode selection switch 122 and a trigger switch 123. The trigger switch 123 is a 2-step switch and is arranged to turn on a switch SW1 when the trigger switch 123 is pushed halfway down its stroke and another switch SW2 when it is fully pushed.

A system controller 114 is arranged to control the operation of the electronic video camera in accordance with an instruction received from the operation part 113. A white balance (hereinafter referred to as WB) sensor 115 is provided for detecting the state of color temperature of the object of shooting for adjustment of the white balance of an image picked up. A light measurement sensor (hereinafter referred to as AE sensor) 116 is provided for detecting the brightness of the object.

With the electronic video camera arranged in the above-stated manner, in the case of manual shooting, the camera operator selects, before shooting, a compression ratio by the compression mode selection switch 122.

Figure 5:
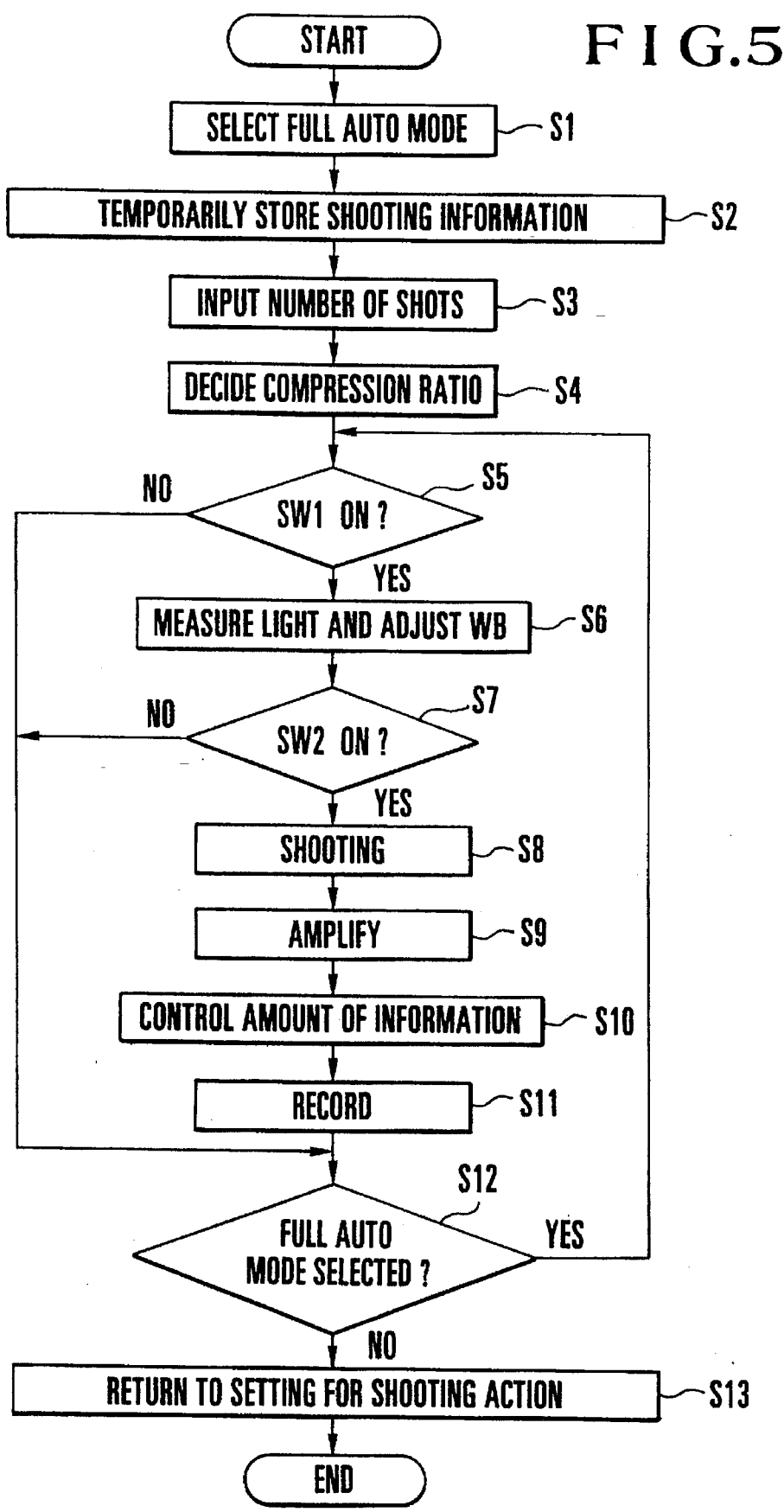
FIG. 5 is a flow chart showing recording processes in a full automatic shooting mode of the electronic video camera shown in FIG. 4.

A first example of the full automatic shooting operation of the electronic video camera which is arranged in the above-stated manner is described below with reference to FIG. 5 which is a flow chart:

At a step S1, a "Full Auto" mode is selected by the shooting mode selection switch 121 of the operation part 113. At a step S2, shooting information which has been used up to this point of time (exposure data, shutter speed data, white balance data, the gain of the amplifier 104, the ratio of compression, etc.) is stored temporarily at a memory which is provided within the system controller 114. At a step S3, a number of shots expected to be taken from now is inputted by means of an operation switch which is not shown but is included in the operation part 113. At a step S4, the system controller 114 reads the remaining amount of the recording capacity of the HDD 110 through the I/F circuit 111. To permit all the expected number of shots to be taken, the compression ratio is automatically decided on the basis of the expected number of shots and the remaining amount of the recording capacity of the HDD 110 irrespective of the compression mode selection switch 122. The compression ratio thus automatically decided is displayed on the outside of the camera and within a viewfinder.

At a step S5, a check is made for the state of the switch SW1. When the switch SW1 is turned on, the flow of operation comes to a step S6. At the step S6, the system controller 114 measures the brightness of the object through the light measurement sensor 116 and, from the result of the light measurement, decides an exposure, a shutter speed and the necessity or nonnecessity of flashing by a flash device. In a case where the brightness of the object obtained from the light measurement sensor 116 is darker than a predetermined value, the amplifying amount (gain) of the amplifier 104 for the image signal outputted from the image sensor 103 is increased. The image signal is amplified, in this case, to a greater extent than in the case of normal shooting. The system controller 114 detects the state of color temperature of the object through the WB sensor 115 and adjusts the WB.

At a step S7, a check is made for the state of the switch SW2 of the trigger switch 123. When the switch SW2 is turned on, the flow comes to a step S8. At the step S8, the system controller 114 causes the image sensor 103 to be exposed to the light of the object image by driving the shutter 102. The image sensor 103 converts the object image picked up into an electrical image signal.

At a step S9, the image signal from the image sensor 103 is inputted to the amplifier 104 and amplified according to the amplifying amount which has been decided as mentioned above. The image signal amplified by the amplifier 104 is held at the S/H circuit 105 for a predetermined period of time. After that, the image signal is inputted to the A/D conversion circuit 106 to be converted into digital image data. The digital image data is stored in the memory 107 through the memory controller 108.

At a step S10, the image data stored in the memory 107 is inputted to the compression circuit 109 via the memory controller 108. The amount of information of the image data is then controlled by the compression circuit 109 in accordance with a predetermined compression ratio. At a step S11, the image data is supplied to the I/F circuit 111 to be recorded on the HDD 110.

The embodiment may be arranged to display the compression ratio of the image data within a viewfinder which is not shown and also at a display part which is provided on the outside of the electronic video camera. The display part may be arranged to display a number of recordable shots or the remaining amount of the recording capacity of the HDD 110. Further, the embodiment may be arranged to make a warning at the display part when the number of recordable shots becomes a small number or zero.

Further, the embodiment may be arranged such that, if the compression ratio decided happens to exceed a predetermined value in deciding the compression ratio, a warning is given either at the display part mentioned above or at a sound emitting part which is not shown.

At a step S12, if the "Full Auto" mode is canceled by the shooting mode selection switch 121 at the operation part 113, the flow comes to a step S13. At the step S13, in accordance with the shooting information stored at the memory within the system controller 114, data for shooting by the electronic video camera is reset and the electronic video camera is brought into a state obtained before the "Full Auto" mode. If the "Full Auto" mode is found to be still selected at the step S12, the flow of operation comes back to the step S5.

Figure 6:
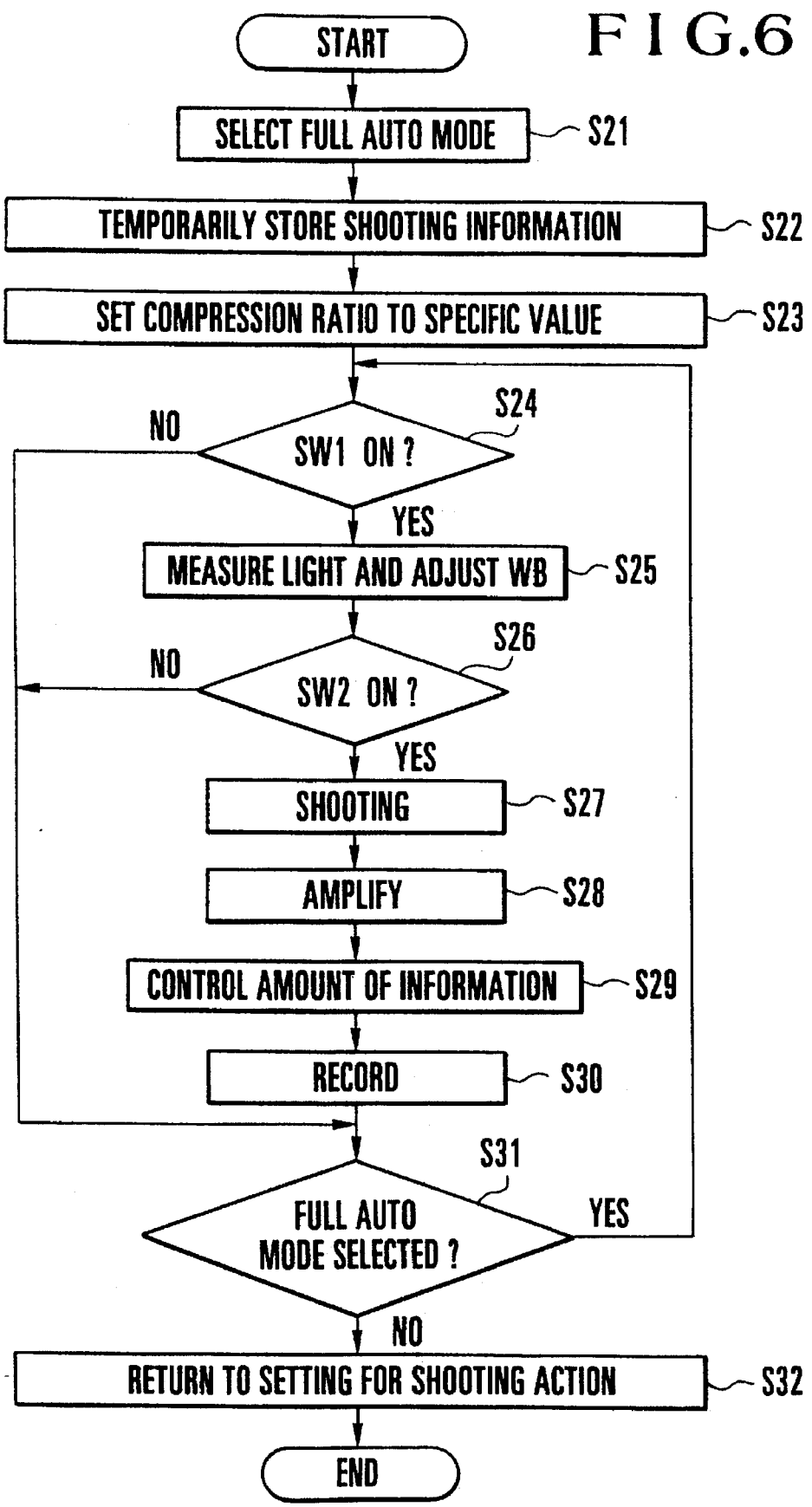
FIG. 6 is a flow chart showing recording processes in the full automatic shooting mode of the electronic video camera shown in FIG. 4.

A second example of the full automatic operation of the electronic still video camera arranged as shown in FIG. 4 is described as follows, with reference to FIG. 6 which is a flow chart:

At a step S21, the "Full Auto" mode is selected by the shooting mode selection switch 121 at the operation part 113. At a step S22, shooting information which has been used up to this point of time (exposure data, shutter speed data, white balance data, the gain of the amplifier 104, the ratio of compression, etc.) is stored temporarily at a memory which is provided within the system controller 114. At a step 23, the compression ratio of the compression circuit 109 is automatically set at a specific compression ratio which does not degrade the image quality. The compression ratio may be set at "0".

At a step S24, a check is made for the state of the switch SW1 of the trigger switch 123. When the switch SW1 is turned on, the flow of operation comes to a step S25. At the step S25, the system controller 114 measures the brightness of the object through the light measurement sensor 116 and, from the result of the light measurement, decides an exposure, a shutter speed and the necessity or nonnecessity of flashing by a flash device. In a case where the brightness of the object obtained from the light measurement sensor 116 is darker than a predetermined value, the amplifying amount (gain) of the amplifier 104 for the image signal outputted from the image sensor 103 is increased. The image signal is then amplified to a greater extent than for normal shooting. The system controller 114 detects the state of color temperature of the object through the WB sensor 115 and adjusts the white balance.

At a step S26, a check is made for the state of the switch SW2 of the trigger switch 123. When the switch SW2 is turned on, the flow comes to a step S27. At the step S27, the system controller causes the image sensor 103 to be exposed to the light of the object image by driving the shutter 102. The image sensor 103 converts the object image picked up into an electrical image signal. At a step S28, the image signal from the image sensor 103 is inputted to the amplifier 104 and amplified according to the amplifying amount which has been decided as mentioned above. The image signal amplified by the amplifier 104 is held at the S/H circuit 105 for a predetermined period of time. After that, the image signal is inputted to the A/D conversion circuit 106 to be converted into digital image data. The digital image data is stored in the memory 107 through the memory controller 108.

At a step S29, the image data stored in the memory 107 is inputted to the compression circuit 109 via the memory controller 108. The amount of information of the image data is then controlled by the compression circuit 109 in accordance with a predetermined compression ratio. At a step S30, the image data is then outputted to the I/F circuit 111 to be recorded on the HDD 110.

The compression ratio of the image data may be displayed within a viewfinder which is not shown and also at a display part which is provided on the outside of the electronic video camera. The display part may be arranged to display a number of recordable shots or the remaining amount of the recording capacity of the HDD 110. Further, a warning may be made at the display part when the number of recordable shots becomes a small number or zero.

At a step S31, if the "Full Auto" mode is canceled by the shooting mode selection switch 121 at the operation part 113, the flow comes to a step S32. At the step S32, in accordance with the shooting information stored at the memory within the system controller 114, data for shooting by the electronic video camera is reset and the electronic video camera is brought into a state obtained before the "Full Auto" mode. If the "Full Auto" mode is found to be still selected at the step S31, the flow of operation comes back to the step S24.

Figure 7:
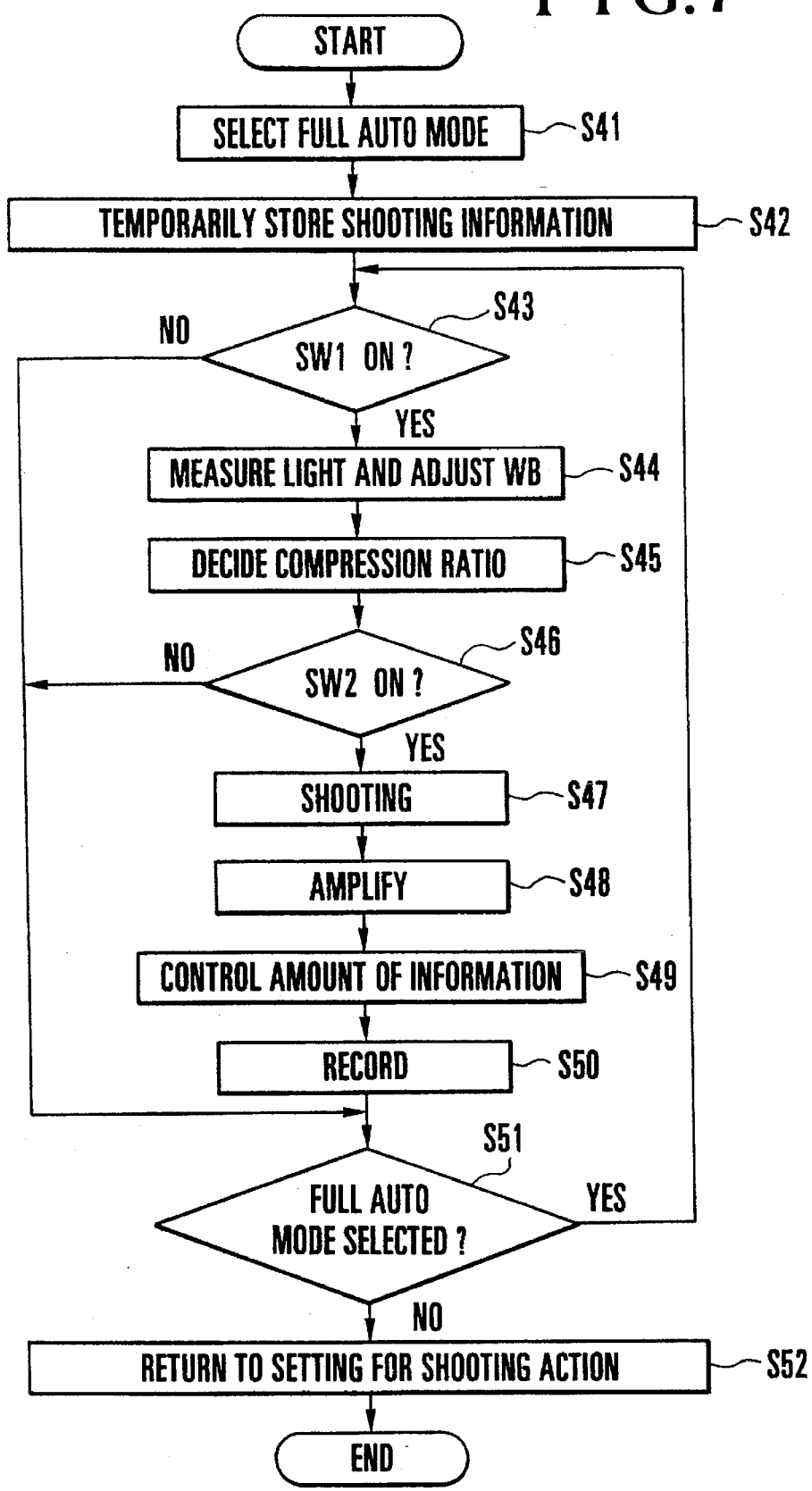
FIG. 7 is a flow chart showing recording processes in the full automatic shooting mode of the electronic video camera shown in FIG. 4.

Next, a third example of the full automatic shooting operation is described below with reference to FIG. 7 which is a flow chart:

At a step S41, the "Full Auto" mode is selected by the shooting mode selection switch 121 of the operation part 113. At a step S42, shooting information which has been used up to this point of time (exposure data, shutter speed data, white balance data, the gain of the amplifier 104, the ratio of compression, etc.) is stored temporarily at a memory which is provided within the system controller 114. At a step S43, when the switch SW1 of the trigger switch 123 is turned on, the flow of operation comes to a step S44. At the step S44, the system controller 114 measures the brightness of the object through the light measurement sensor 116 and, from the result of the light measurement, decides an exposure, a shutter speed and the necessity or nonnecessity of flashing by a flash device.

In a case where the brightness of the object obtained from the light measurement sensor 116 is darker than a predetermined value, the amplifying amount (gain) of the amplifier 104 for the image signal from the image sensor 103 is increased. The image signal is amplified, in this case, to a greater extent than for normal shooting. The system controller 114 detects the state of color temperature of the object through the WB sensor 115 and adjusts the white balance.

At a step S45, the compression ratio of the compression circuit 109 is decided according to the result of detection made by the light measurement sensor 116. The method for deciding the compression ratio is as follows: In a case where the measured brightness of the object is darker than a predetermined value, the compression ratio is automatically set at a little higher value than a compression ratio for normal shooting. With the exception of such a case, the compression ratio is always automatically set at such a value that does not degrade the image quality.

At a step S46, a check is made for the state of the switch SW2 of the trigger switch 123. When the switch SW2 is turned on, the flow comes to a step S47. At the step S47, the system controller 114 causes the image sensor 103 to be exposed to the light of the object image by driving the shutter 102. The image sensor 103 converts the object image picked up into an electrical image signal. At a step S48, the image signal from the image sensor 103 is inputted to the amplifier 104 and amplified according to the amplifying amount which has been decided as mentioned above. The image signal amplified by the amplifier 104 is held at the S/H circuit 105 for a predetermined period of time. After that, the image signal is inputted to the A/D conversion circuit 106 to be converted into digital image data. The digital image data is stored in the memory 107 through the memory controller 108.

At a step S49, the image data stored in the memory 107 is inputted to the compression circuit 109 via the memory controller 108. The amount of information of the image data is controlled by the compression circuit 109 in accordance with a predetermined compression ratio. At a step S50, the image data is supplied to the interface (I/F) circuit 111 to be recorded on the HDD 110.

The compression ratio of the image data may be arranged to be displayed within a viewfinder which is not shown and also at a display part which is provided on the outside of the electronic video camera. The display part may be arranged to display a number of recordable shots or the remaining amount of the recording capacity of the HDD 110. Further, the embodiment may be arranged to make a warning at the display part in a case where the number of recordable shots becomes a small number or zero.

At a step S51, if the "Full Auto" mode is canceled by the shooting mode selection switch 121 at the operation part 113, the flow comes to a step S52. At the step S52, in accordance with the shooting information stored at the memory within the system controller 114, data for shooting by the electronic video camera is reset and the electronic video camera is brought into a state obtained before the "Full Auto" mode. If the "Full Auto" mode is found to be still selected at the step S51, the flow of operation comes back to the step S43.

An electronic video camera may be arranged as another embodiment of this invention to have three different "Full Auto" modes including a first mode in which the compression ratio is varied according to the number of shots, a second mode in which the compression ratio is set at a maximum value to give a maximum number of shots, and a third mode in which no compression is made to have the image quality not impaired by compression.

As described above, the electronic video camera arranged as the third embodiment permits shooting in the full automatic mode in the same manner as in the case of a silver-halide type camera, so that the operability of the electronic video camera can be greatly improved.

Figure 8:
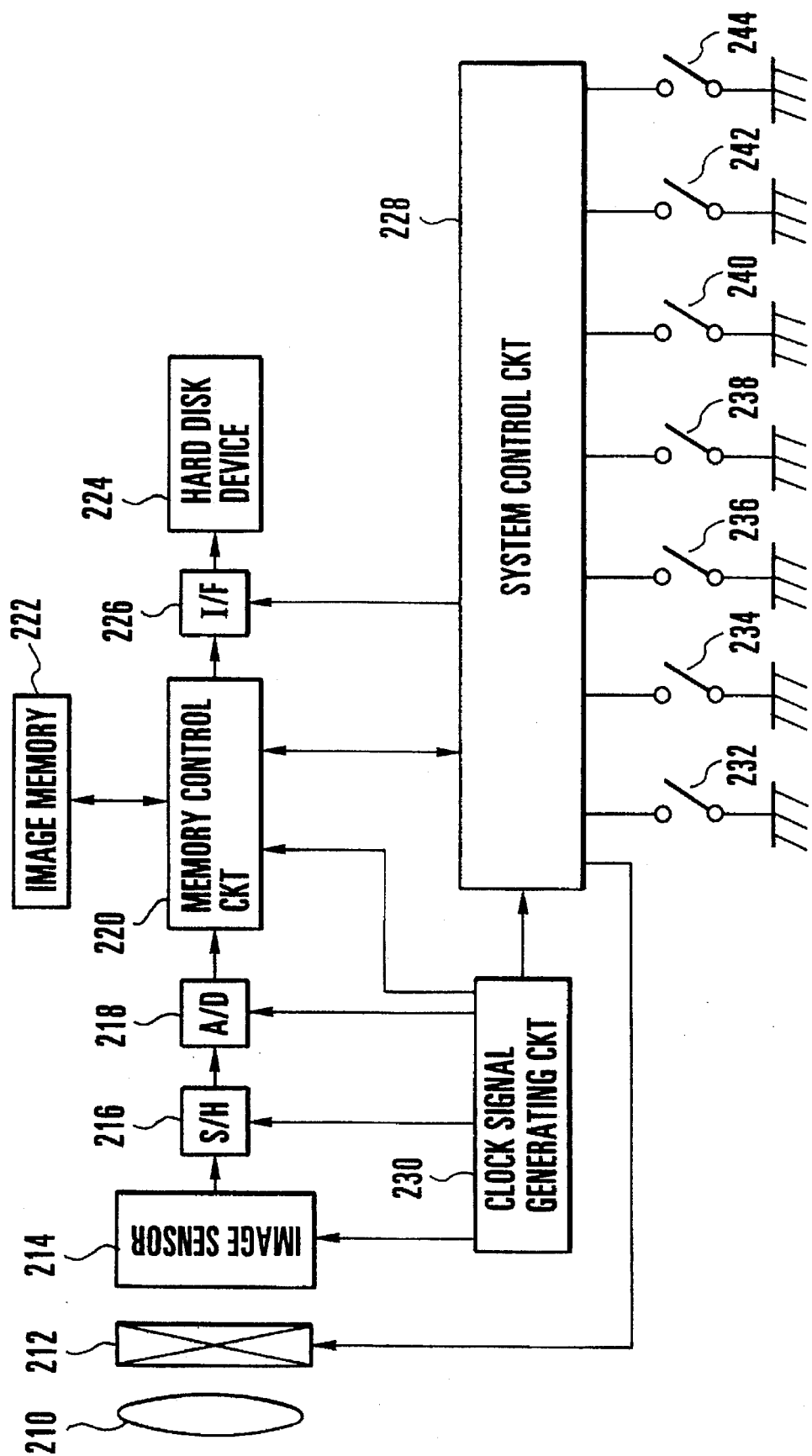
FIG. 8 is a block diagram showing an electronic video camera arranged according to this invention as a fourth embodiment thereof.

FIG. 8 is a block diagram showing in outline the arrangement of an electronic video camera arranged as a fourth embodiment of this invention. In FIG. 8, reference numeral 210 denotes a photo-taking lens. A control mechanism 210 is arranged to control the quantity of light passing through a diaphragm, a shutter or the like. An image sensor 214 is arranged to convert an object image into an electrical signal. A sample-and-hold (S/H) circuit 216 is arranged to sample and hold the output of the image sensor 214. An A/D conversion circuit 218 is arranged to convert the output of the S/H circuit 216 into a digital signal. A memory control circuit 220 is arranged to write the output data (image data) of the A/D conversion circuit 218 into an image memory 222 and to read out the data stored in the image memory 222 according to the processing speeds of circuits arranged subsequently to the memory control circuit 220.

A hard disk device 224 is arranged to be a final recording device. An interface (I/F) circuit 226 is provided for recording the image data outputted from the memory control circuit 220 on the hard disk device 224. The final recording device is not limited to the hard disk device but may be selected from among a group consisting of a flexible magnetic disc device, an optical disk device, an optoelectromagnetic disk device, a flash memory and a semiconductor memory such as an EEPROM or a DRAM backed up by a battery. Further, the semiconductor memory device may be a known IC memory card which is formed in a card-like shape.

A system control circuit 228 is arranged to control the whole system of the electronic video camera. A clock signal generating circuit 230 supplies timing clock signals to the image sensor 214, the S/H circuit 216, the A/D conversion circuit 218, the memory control circuit 220 and the system control circuit 228.

A group of switches 232 to 244 are provided for giving instructions to the system control circuit 228 for various actions. A shooting preparation switch 232 is for preparation for shooting (start of exposure control and focus control). A shooting switch 234 is for a shutter action (start of an exposure action and a reading action on the image sensor 214). A normal switch 236 is for causing the image sensor 214 to act at a normal image pickup (shooting) sensitivity. A gain increase switch 238 is for increasing the image pickup sensitivity of the image sensor. The normal switch 236 and the gain increase switch 238 are interlocked with each other in such a way as to have one of them turned on when the other is off.

A fine switch 240 is arranged to give an instruction for a fine (recording) mode in which the image data is fully recorded on the hard disk device 224 without subsampling (reducing the amount of information) the image data. An economy switch 242 is for an economy mode in which a portion of the image data obtained by subsampling the image data is recorded on the hard disk device 224 to include a smaller amount of information. An automatic (operation) switch 244 is for automatic selection of the fine mode or the economy mode. The fine switch 240, the economy switch 242 and the automatic switch 244 are interlocked with each other in such a manner that, when one of them is in an on-state, the rest of them are off.

In the case of this (fourth) embodiment, the memory control circuit 220 operates under the control of the system control circuit 228 to transfer to the interface (I/F) circuit 226 all the image data stored in the image memory 222 in the fine mode and only a portion of the image data stored in the image memory 222 in the economy mode by subsampling the image data stored.

Figure 9:
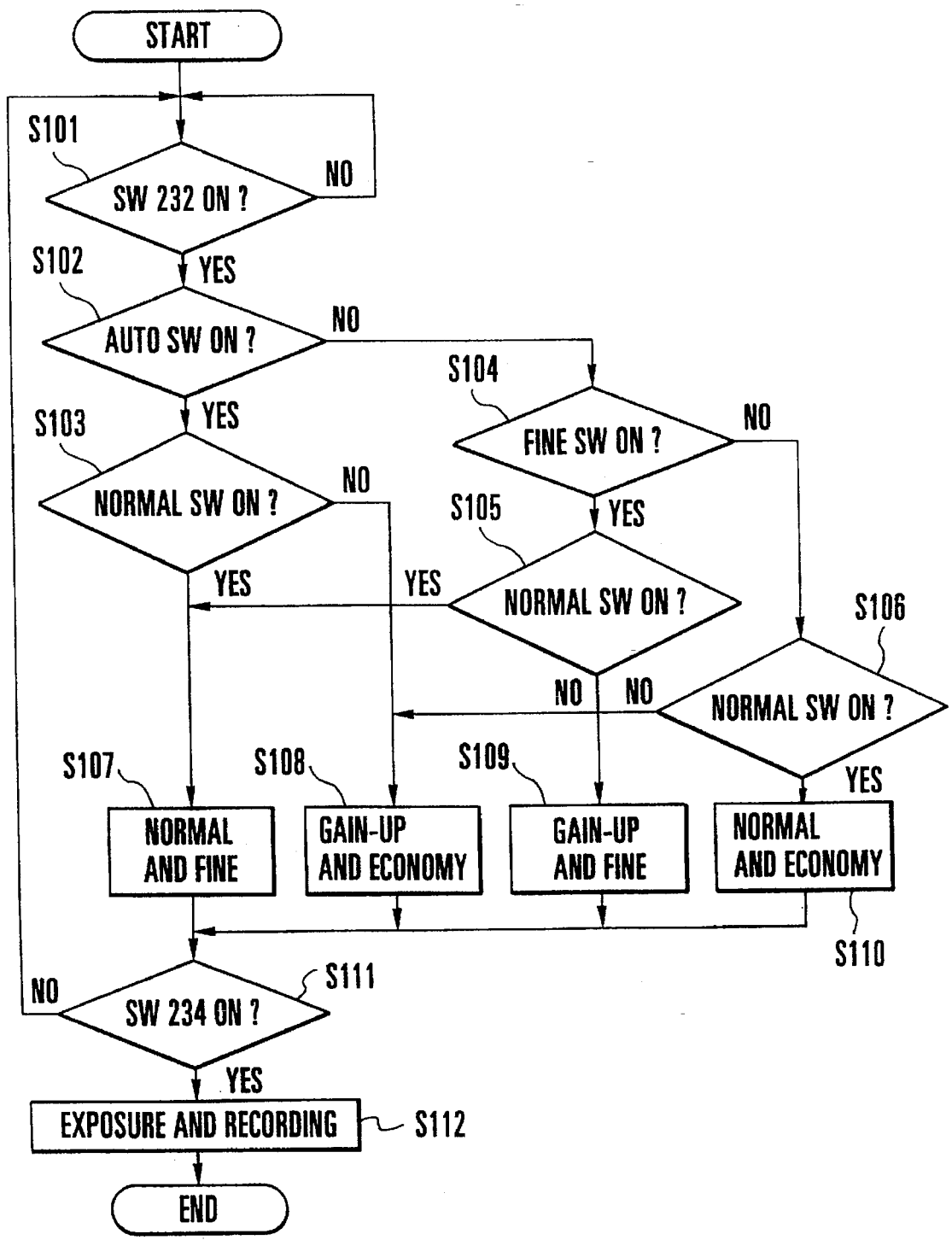
FIG. 9 is a flow chart showing the operation of the electronic video camera shown in FIG. 8.

The operation of this embodiment is described below with reference to FIG. 9 which is a flow chart:

At a step 101, when the shooting preparation switch 232 is turned on, the flow of operation comes to a step S102. At the step S102, the system control circuit 228 makes a check for the state of the automatic switch 244. If the automatic switch 244 is found to be in an on-state, the embodiment is in the automatic mode and the flow comes to a step S103 to make a check for the state of the normal switch 236. A combination of the image pickup sensitivity of the image sensor 214 and the amount of image data to be recorded on the hard disk device 224 is decided according to the state of the normal switch 236. More specifically, the flow comes to a step S107 to select the fine mode in which all the image data is recorded at a normal image pickup sensitivity if the normal switch 236 is found to be in an on-state, or to a step S108 to select the economy mode in which the image data is subsampled and recorded at a high image pickup sensitivity with a portion of the image data thinned out.

In a case where the automatic switch 244 is found to be in an off-state at the step S102, the normal or high image pickup sensitivity and the amount of information of the image data to be recorded (the fine or economy mode) are combined at one of steps S107, S108, S109 and S110 through steps S104, S105 and S106 according to the selected states of the switches 236, 238 and 240.

More specifically, at steps S104 and S105, if both the fine switch 240 and the normal switch 236 are in their on-states, the flow comes to the step S107 to select the fine mode in which all the image data is recorded at the normal image pickup sensitivity. If the normal switch 236 is in an off-state while the fine switch 240 is in the on-state, the flow comes to the step S109 to select another fine mode in which all the image data is recorded at a high image pickup sensitivity. If both the fine switch 240 and the normal switch 236 are off, the flow comes to the step S108 to select the economy mode in which the image data is subsampled and recorded at a high image pickup sensitivity with a portion of the image data thinned out. If the normal switch 236 is on while the fine switch 240 is off, the flow comes to the step S110 to select another economy mode in which the image data is subsampled and recorded at the normal image pickup sensitivity with a portion of the image data thinned out.

At a step S111, a check is made for the state of the shooting switch 234. The above-stated modes can be changed from one over to another before the shooting switch 234 is turned on. When the shooting switch 234 is turned on, the flow comes to a step S112. At the step S112, the image sensor 214 is exposed to the light of an object image. An electric charge signal is read out from the image sensor 214 and recorded on the hard disk device 224, in the following manner: The S/H circuit 216 samples and holds the output of the image sensor 214. The A/D converter (conversion circuit) 218 digitizes the output of the S/H circuit 216 into image data. The memory control circuit 220 stores the image data outputted from the A/D converter 218 temporarily in the image memory 222 and then reads out the stored image data from the image memory 222 at a speed which corresponds to the data writing speed of the hard disk device 224. In the case of the fine mode, the image data is thinned down (by subsampling) at a predetermined rate to reduce the amount of information of the image data to be recorded. The interface circuit 226 transfers the image data from the memory control circuit 220 to the hard disk device 224 to record the image data on the hard disk device 224.

The fourth embodiment is arranged to adjust the amount of information of the image data to be recorded on the hard disk device 224 by thinning out the data. However, this arrangement may be changed to adjust the amount of information of the image data by changing a compression ratio through a compression ratio coding process.

In the automatic mode, the fourth embodiment selects the image data recording mode according to the image pickup sensitivity set by the operator. However, that arrangement may be changed to select the image data recording mode according to a measured light value and exposure time obtained in the stage of preparation for shooting and also the temperature characteristic and the noise generating amount of the image sensor 214.

Some of preferred embodiments of this invention have been described by way of example on the assumption that this invention is applied to still image shooting and recording. However, this invention is of course also applicable to moving image shooting and recording.

As apparent from the foregoing description of embodiments, in the event of image signal deterioration or the like, the arrangement according to this invention permits efficient utilization of the recording medium by reducing the amount of information of the image signal to be recorded on the recording medium.

What is claimed is:

1. An electric video camera in which an object image is picked up, the picked up image is converted into an electric signal to form an image signal which is recorded on a recording medium, comprising:

a) image pickup means for picking up the object image and outputting an image signal corresponding to the picked up object image;

b) detecting means for detecting the state of picking up the object image at said image pickup means;

c) image signal subsampling means having a plurality of kinds of subsampling modes having different subsampling rates of respective signals for enabling to thin out by subsampling the image signal output from said pickup means in accordance with any one of the plurality of kinds of the subsampling modes and for outputting the subsampled image signal as an image information signal;

d) control means for selecting, in accordance with a result of detection provided by said detecting means, any one of the plurality of kinds of the subsampling modes in said image signal subsampling means and for controlling said image signal subsampling means so as to thin out by subsampling the image signal output from said image pickup means in accordance with the selected subsampling mode; and e) recording means for recording on the recording medium the image information signal outputted from said image signal subsampling means.

2. A video camera according to claim 1, wherein said detecting means is arranged to detect the brightness of the object image.

3. A video camera according to claim 2, further comprising sensitivity setting means for setting an image pickup sensitivity of said image pickup means according to the result of detection provided by said detecting means.

4. An electric video camera in which an object image is picked up, the picked up image is converted into an electric signal to form an image signal which is recorded on a recording medium, comprising:

a) image pickup means for picking up the object image and outputting an image signal corresponding to the picked up object image;

b) image pickup sensitivity setting means for setting an image pickup sensitivity in said image pickup means;

c) image signal subsampling means having a plurality of kinds of subsampling modes having different subsampling rates of respective signals for enabling to thin out by subsampling the image signal output from said pickup means in accordance with any one of the plurality of kinds of the subsampling modes and for outputting the subsampled image signal;

d) control means for selecting, in accordance with the image pickup sensitivity set by said image pickup sensitivity setting means, any one of the plurality of kinds of the subsampling modes in said subsampling means and for controlling said image signal subsampling means so as to thin out by subsampling the image signal output from said image pickup means in accordance with the selected subsampling mode; and e) recording means for recording on the recording medium the image information signal outputted from said image signal subsampling means.

5. A video camera according to claim 4, wherein said control means is arranged, when said image pickup sensitivity setting means sets the image pickup sensitivity at a relatively higher sensitivity than a normal sensitivity, to select any one of the plurality of kinds of the subsampling modes which, after subsampling, has an amount of information smaller than those for subsampling modes normally selected and to subsample said image signal subsampling means so as to thin out by subsampling the image signal output from said image pickup means in accordance with the selected subsampling mode.

6. A video camera according to claim 4, wherein said image pickup means is arranged to perform an image pickup action at the image pickup sensitivity set by said sensitivity setting means.

* * * * *

UNITED STATES PATENT AND TRADEMARK OFFICE
CERTIFICATE OF CORRECTION

PATENT NO. : 5,638,184

DATED : June 10, 1997

INVENTOR(S) : Fujimoto et. al.

It is certified that error appears in the above-identified patent and that said Letters Patent is hereby corrected as shown below:

Col. 13, line 28, delete "S110" and insert -- S110 --.

Signed and Sealed this

Twenty-eighth Day of July, 1998

*Attest:*

BRUCE LEHMAN

*Attesting Officer*   Commissioner of Patents and Trademarks